United States Patent [19]

Frick

[11] Patent Number: 5,318,353
[45] Date of Patent: Jun. 7, 1994

[54] VEHICLE WHEEL CENTERING APPARATUS

[75] Inventor: Ewald Frick, Alpirsbach, Fed. Rep. of Germany

[73] Assignee: BBS Kraftfahrzeugtechnik AG, Schiltach, Fed. Rep. of Germany

[21] Appl. No.: 99,250

[22] Filed: Jul. 29, 1993

Related U.S. Application Data

[63] Continuation of Ser. No. 935,861, Aug. 26, 1992, abandoned.

[51] Int. Cl.⁵ ............................................. B60B 27/00
[52] U.S. Cl. ............................. 301/105.1; 301/35.62; 301/111
[58] Field of Search ................. 301/5.1, 9.1, 105.1, 301/111, 112, 119, 120, 121, 122, 35.62, 35.63; 403/13; 29/464

[56] References Cited

U.S. PATENT DOCUMENTS 3,138,407  6/1964  Duggan ..................... 301/35.62 X
4,699,431  10/1987  Daberkoe ................. 301/105.1 X

FOREIGN PATENT DOCUMENTS 3822469  1/1990  Fed. Rep. of Germany ... 301/105.1
3233807  10/1990  Fed. Rep. of Germany ... 301/105.1
1864818  6/1990  Japan .
1876452  11/1990  Japan .
1209393  10/1970  United Kingdom .

Primary Examiner—Russell D. Stormer
Attorney, Agent, or Firm—Dick and Harris

[57] ABSTRACT

A motor vehicle wheel rim assembly is provided which enables use of a wheel rim, having a fixed predetermined internal bore, with various wheel hubs having centering bodies of different external diameters. An insert ring is received within the internal bore of the wheel rim. The insert ring, in turn, has an internal diameter which is configured to closely fit the centering body of the wheel hub of a particular motor vehicle. A spring retaining ring is received within an annular groove within the wheel rim, once the insert ring is in position, to prevent substantial axial movement of the insert ring.

10 Claims, 3 Drawing Sheets

VEHICLE WHEEL CENTERING APPARATUS

This is a continuation of application Ser. No. 07/935,861, filed on Aug. 26, 1992, now hereby abandoned.

BACKGROUND OF THE INVENTION

Motor vehicle wheel rims are typically attached to wheel hubs which are either affixed to, part of or adjacent to the brake apparatus, by bolts. The brake apparatus, wheel hub and wheel rim are all configured to rotate about a common axis of rotation, in order to ensure that the respective components are balanced. A centering body, which is aligned coaxially with the axis of rotation, projects outwardly from the wheel hub and is received by an aperture centered in the wheel rim.

The centering bodies of the wheel hubs of motor vehicles vary in diameter, from manufacturer to manufacturer. However, it would be undesirable, both in terms of cost and storage space, for a dealer to stock a different wheel rim to accommodate each separate centering body for each different wheel hub for each manufacturer. Attempts have been made to keep inventory stock of wheel rims low by providing each wheel rim with a common size centering aperture and placing insert rings having different internal borings in the centering aperture of the wheel rim.

Prior art insert rings are known to have several potential drawbacks, however, such as: (1) the insert rings have been difficult to install or remove; (2) the insert rings do not adequately transmit forces from the wheel hub to the wheel rim; and (3) the insert rings are difficult or expensive to manufacture.

An example of a prior art insert ring may be found in German Patent DE-PS 32 33 807. In this reference is disclosed an insert ring which is in the form of a split ring having a gap between the ends of the split. The insert ring is received within an annular groove within the internal bore of the wheel rim. To install the insert ring, it is compressed to fit into the bore and be received in the annular groove where it is allowed to expand to a limited extent, but remains in a somewhat compressed condition.

Such an insert ring requires that a relatively large annular groove be machined or otherwise formed within the internal bore of the wheel rim, which means the manufacturing cost is increased. The insert ring is sensitive to manufacturing errors, such as surface irregularities, which could prevent the insert ring from being fully or uniformly received within the annular groove. The construction of the insert ring as a split ring, to facilitate insertion, requires that the ring have a certain amount of flexibility. In order to withstand the stresses to which the insert ring will be subjected, it should be constructed to be substantially rigid; the split ring construction sacrifices rigidity and introduces instability. The divergent desired characteristics are particularly difficult to meet, with respect to the material and manufacturing processes required. For example, spring steel required for resilience does not machine well. Removal of such a split ring insert ring is difficult. The spaced apart ends of the split ring construction can cause damage to the wheel rim. In addition, the split ring construction makes determination of the sizing of the insert rings difficult, as the uninstalled diameter is different from both the installed diameter and the diameter of the compressed ring during installation.

Another prior art insert ring is disclosed in Japanese Utility Model Number 1864818. The insert ring includes a large radially extending flange portion which extends perpendicular to the axis of rotation of the wheel and adds considerable mass to the wheel. Screws are used for attachment of the insert ring to a disc portion which, in turn, bolts to the wheel rim. The numerous bolt and screw holes tend to weaken the structure of the wheel rim. In addition, the screws must be made of steel for strength, and if the wheel rim is manufactured from aluminum, an electrical cell/circuit is created, with its known destructive characteristics. Still further, the installation or removal of the insert ring of the Japanese Utility Model Number 1864818, requires the tightening or loosening of numerous screws. In addition, the use of screws to affix an insert ring does not permit accurate centering when the screws are tightened, since because of the clearances provided in the screw holes, the threading does not provide a centering force on the screws, and, in turn, the insert ring.

A further prior art insert ring, is disclosed in Japanese Utility Model Number 1876452. Insert ring (1) is configured as a simple smooth-surfaced cylindrical annular ring, having a radially inwardly directed bevel. Such a configuration has the drawback of being permitted to move axially, and relies strictly on its extremely close tolerance fit with the centering body for its operation.

It is an object of the invention to provide a motor vehicle wheel rim assembly, in which an insert ring is provided to permit a wheel rim having a fixed predetermined internal bore to be fitted onto vehicle wheel hubs having centering bodies of different external diameters, in which the insert ring is a solid, continuous and unbroken toroidal body.

It is a further object of the invention to provide a wheel rim assembly which provides for the secure mounting and facilitated removal of the insert ring within the internal bore of the wheel rim.

Still another object of the invention is to provide a wheel rim assembly utilizing an insert ring, having a simplified and more economical construction.

Yet another object of the invention is to provide a wheel rim assembly which uses an insert ring which is of compact size and low mass, for improved performance of the overall wheel rim.

An additional object of the invention is to provide a wheel rim assembly having an insert ring which is advantageously configured to provide improved transfer of forces from the wheel rim to the wheel hub.

These and other objects of the invention will become apparent in light of the present specification, claims and drawings.

SUMMARY OF THE INVENTION

The present invention is directed to a motor vehicle wheel rim assembly adapted for use with a plurality of different vehicles having a plurality of different wheel hub configurations, wherein each wheel hub has a contact surface and a centering body having a particular external diameter less than a predetermined maximum diameter.

The wheel rim assembly comprises a motor vehicle wheel rim having an internal bore having a predetermined internal diameter greater than the maximum diameter of any centering body external diameter for which it is intended to be used, an internal shoulder projecting radially inwardly within the internal bore, a hub bearing surface to be juxtapositioned with the wheel hub contact surface, and an annular groove arranged within the internal bore and disposed in spaced relation from the hub bearing surface.

An insert ring, having a first external diameter, is operably configured to be snugly received within the internal bore of the wheel rim. The insert ring further has an internal diameter operably configured to snugly receive the centering body of the wheel hub. The insert ring is further configured to be operably positioned substantially concentrically between the centering body and the wheel rim and has a radially projecting external shoulder having a radial surface facing toward the hub bearing surface and extending radially inwardly from the first external diameter to a second external diameter.

A resilient biasing retaining ring is provided, having an internal diameter less than the first external diameter of the insert ring and greater than the second external diameter of the insert ring. The retaining ring is to be fitted substantially between the insert ring and the internal bore of the wheel rim, and partially received within the annular groove of the internal bore at the spaced relation from the hub bearing surface, such that when the insert ring is positioned within the internal bore, the insert ring is substantially captured between the retaining ring and the internal shoulder of the internal bore of the wheel rim to preclude substantial axial movement of the insert ring with respect to the internal bore of the wheel rim.

The wheel rim may be provided with an insertion chamfer, operably extending from the hub bearing surface to the internal bore, to facilitate insertion of the insert ring. The fit between the internal bore and the insert ring is contemplated to be what is established by the German Institute for Standardization (DIN e.V.) as a transition fit, in that the relative tolerances of the insert ring and of the internal bore overlap. The insert ring is therefore neither pressed into the internal bore, nor is there significant clearance between them. An H-7 fitting clearance, according to the DIN system, is considered to be an optimal fit.

In a preferred embodiment of the invention, the insert ring has an inner radial surface spaced from an opposed outer radial surface. The outer radial surface is substantially parallel to, but does not extend beyond, the hub bearing surface of the wheel rim.

The insert ring may have a spacing chamfer operably extending radially inwardly from the first external diameter. This will ensure that the insert ring does not abut in the corner area of the internal bore, and thus will not jam axially against the wheel rim. In addition, the insert ring is configured not to bind the spring retaining ring. Accordingly, the insert ring is configured to bear solely radially directed forces, which enables the insert ring to be small sized.

In the preferred embodiment of the invention, the retaining ring does not extend axially beyond the hub bearing surface of the wheel rim.

The insert ring preferably has an internal bore surface and an insertion chamfer, extending from the outer radial surface toward the internal bore surface, for facilitating insertion of the centering body of the wheel hub.

DETAILED DESCRIPTION OF THE INVENTION

Figure 1:
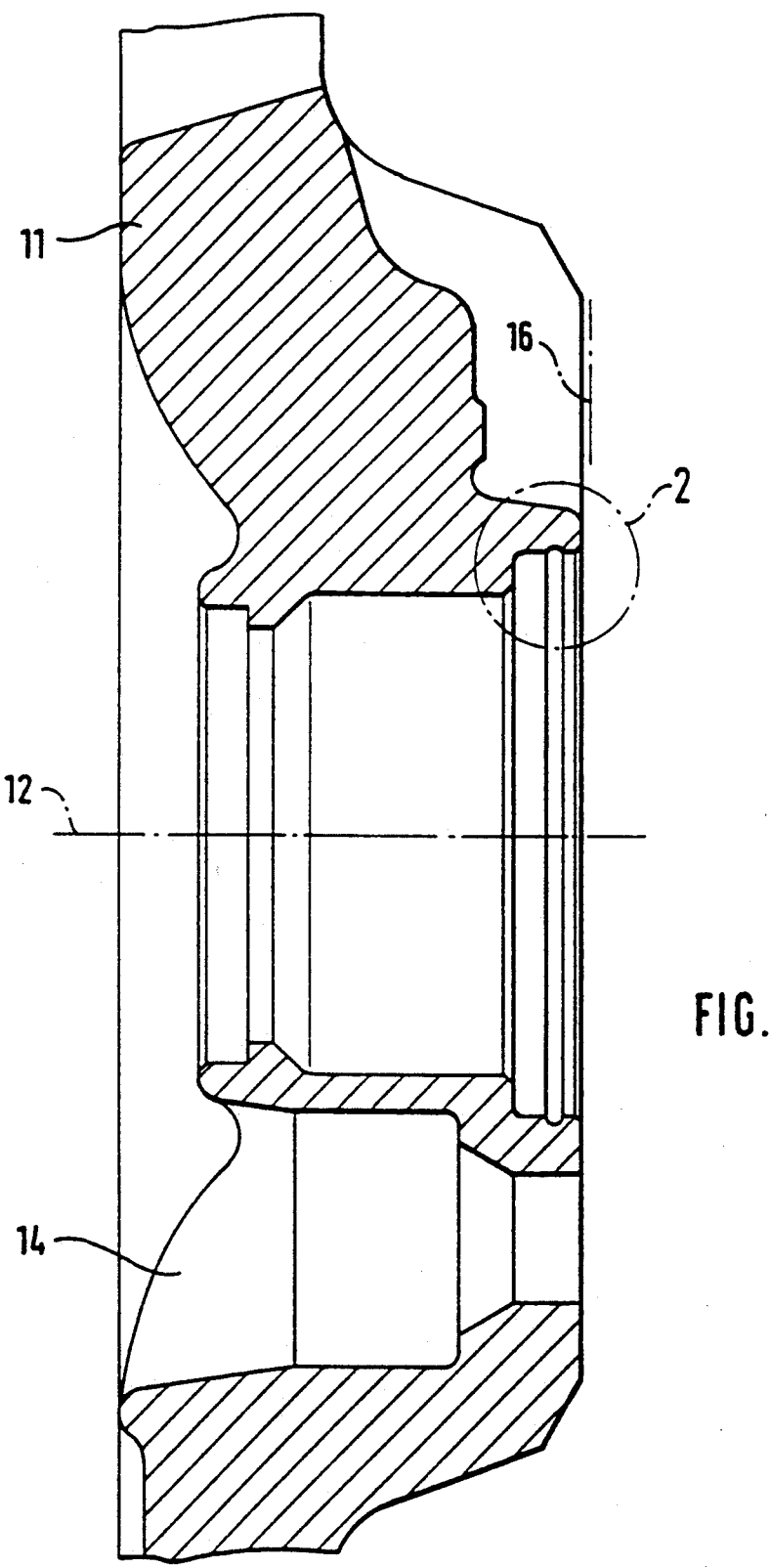
FIG. 1 is a fragmentary view of a wheel rim, partially in section.

While this invention is susceptible of embodiment in many different forms, there is shown in the drawings and will be described in detail herein a preferred embodiment, with the understanding that the present disclosure is to be considered as an exemplification of the principles of the invention and is not intended to limit the invention to the embodiment illustrated.

Figure 2:
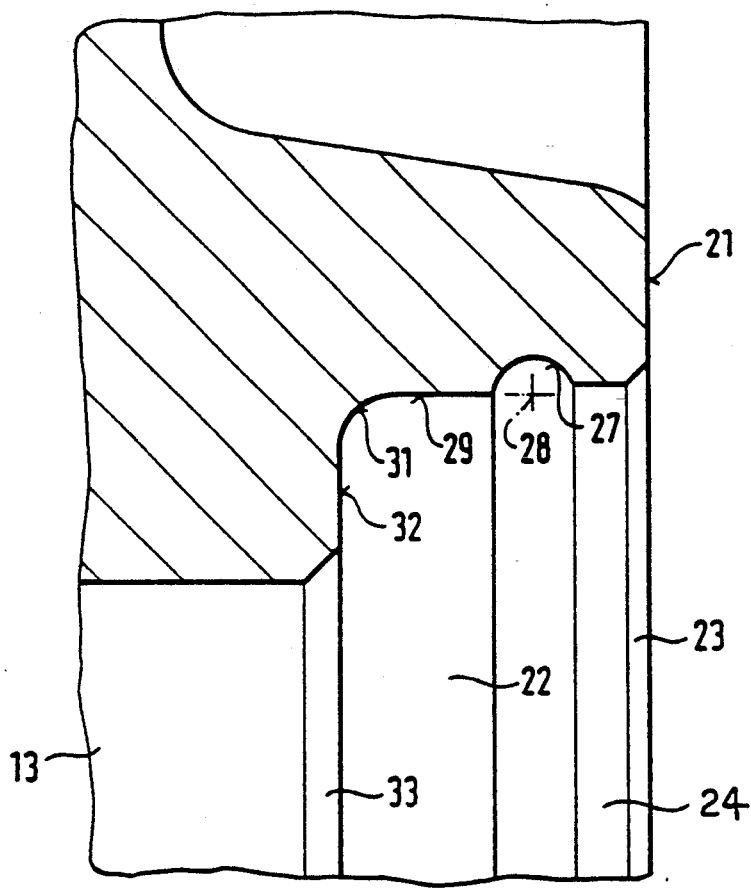
FIG. 2 is an enlarged fragmentary view of region 2 from FIG. 1.
Figure 3:
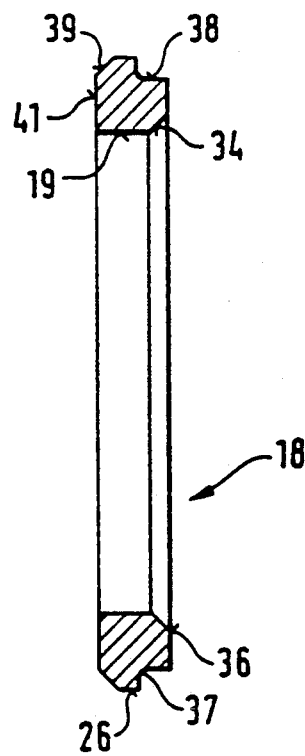
FIG. 3 is a diametrical section of an insert ring according to the present invention.
Figure 4:
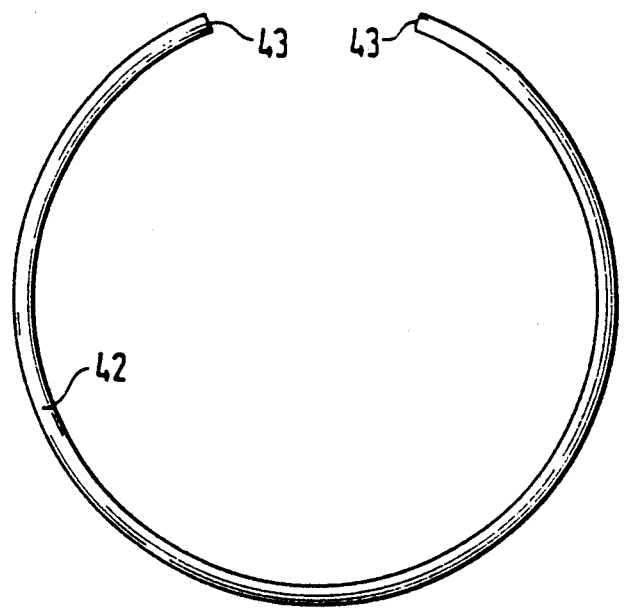
FIG. 4 is a plan view of a spring retaining ring, according to the present invention.

The disc portion of wheel rim 11 is shown in FIG. 1. Wheel rim 11 is configured to be symmetrically weighted, with respect to rotation about axis 12. Central bore 13 (FIG. 2) is provided to generally receive centering body 17 (shown in phantom in FIG. 5) of the wheel hub (not shown) of a motor vehicle. Within screw holes 14 there are placed screws (not shown), by means of which the wheel 11 can be drawn against contact surface 16 of a wheel hub. In the preferred embodiment of the invention which is disclosed herein, central bore 13, has an internal diameter, in the region of surface 29, as shown in FIG. 2, of slightly greater than 70 millimeters, and has a minimum internal diameter of greater than 60 millimeters, in order to accommodate the centering bodies of a plurality of motor vehicle wheels, as indicated hereinbelow. As is known, the diameter of centering body 17 varies from manufacturer to manufacturer, and therefore, the central bore of each wheel rim would, in other circumstances, be required to be sized to fit the particular centering body of each particular make and model of motor vehicle wheel. To manufacture and stock wheel rims individually sized for each make and model is not feasible either in terms of cost or storage.

For a variety of motor vehicles, the sizing of the centering body for wheel hubs ranges from 50 to 60 millimeters in diameter. By way of example, Toyota passenger vehicles generally have a centering body diameter of 54 millimeters; Nissan vehicles, 59 millimeters; Mitsubishi, 60 millimeters; Mazda, 54 millimeters; Honda, 56 millimeters; Isuzu, 56.5 millimeters; Daihatsu, 54 millimeters, and so forth. An interchangeable insert ring 18, having substantially the same cross-sectional configuration, apart from its internal circular annular surface 19, which is coaxial with the axis of rotation 12 of wheel rim 11, will enable the use of a wheel rim having a single internal bore configuration to be used with a variety of motor vehicles.

In a preferred embodiment of the invention, the insert ring 18 is a toroidal member formed without any gaps along its circumference. The insert ring 18 is to be advantageously configured to require no prestressing in order to be fitted within the internal bore, but will effectively transfer forces from the centering body 17 to the wheel rim 11. The insert ring 18 is low in mass and relatively small in size, so that it will occupy little space in inventory storage, so that its characteristics can be checked at any time. Since the insert ring 18 is configured to be an unbroken toroidal body, with the same cross-section along its circumference, it need not be installed in any particular orientation.

Typically, a light metal wheel rim 11, such as is contemplated by the present invention, is fabricated from aluminum, or sometimes, magnesium. The centering body 17 is typically fabricated mostly from steel. Preferably, the insert ring 18 is fabricated from harder material than that from which the wheel rim 11 is constructed. In a particular embodiment, the insert ring 18 is made from machined steel. Accordingly, good cooperation with the spring retaining ring is obtained, since the spring retaining ring 42 must be fabricated from spring steel or similar material.

Insert ring 18 fits around centering body 17, which has a substantially cylindrical contact surface. Insert ring 18 has an external contour which is shaped to be received closely, but not bindingly within the stepped internal bore 22 of wheel rim 11, which opens on the hub bearing surface 21 of wheel rim 11. An insert chamfer 23, which, in a preferred embodiment, has a width of one-half millimeter, enables wheel rim 11 to be positioned on insert ring 18, straight on, without tilting.

An axial surface 24 is concentrically disposed radially inward of insert chamfer 23. The diameter of surface 24 is slightly greater than the diameter of surface 26 of insert ring 18 in the range of a few tenths of a millimeter. Surface 24, therefore, makes it easier to insert the insert ring 18 thanks to its greater diameter. In the preferred embodiment of the invention, the annular surface 26 extends approximately 1.3 millimeters in the axial direction.

Within wheel rim 11, a circumferential groove 27 having a circular cross-section is provided, with its center of cross-sectional curvature 28 positioned at a radius from axis 12 which is smaller than the radius of annular surface 26 from axis 12, by a distance of 0.5 millimeters, or approximately 1% of the diameter of annular surface 26. The radius from the center of cross-sectional curvature 28 to the surface of groove 27 is 1.1 millimeters, yielding a diameter of 2.2 millimeters. Annular surface 29, as indicated above, has a diameter of approximately 70 millimeters, in the preferred embodiment of the invention, which is substantially equal to the maximum external diameter 26 of insert ring 18. The tolerances of each of annular surfaces 26 and 29 are therefore transitional tolerances, as determined by the DIN system. No force is required in order to insert the insert ring; however, no additional clearance is required. Annular surface 29 preferably extends axially for approximately 3 millimeters, in the present embodiment, though slightly greater or lesser axial lengths are contemplated.

Annular surface 29 merges through radially inwardly curving portion 31 which curves through approximately 90 degrees of arc into radially inwardly extending shoulder 32, which is substantially perpendicular to axis 12. Shoulder 32 has a radial width in the low single digit millimeter range; in the preferred embodiment, shoulder 32 has a radial width of 2.8 millimeters. Chamfer 33 provides for transition from shoulder 32 to the narrowest diameter portion of internal bore 13.

Insert ring 18 is configured to have an internal annular surface 19, and an insertion chamfer 34, to facilitate positioning of the insert ring (and wheel rim) onto centering body 17. In the preferred embodiment, annular surface 19 has an axial width of approximately 5 millimeters, or slightly less than 10% of the greatest diameter of insert ring 18.

Figure 5:
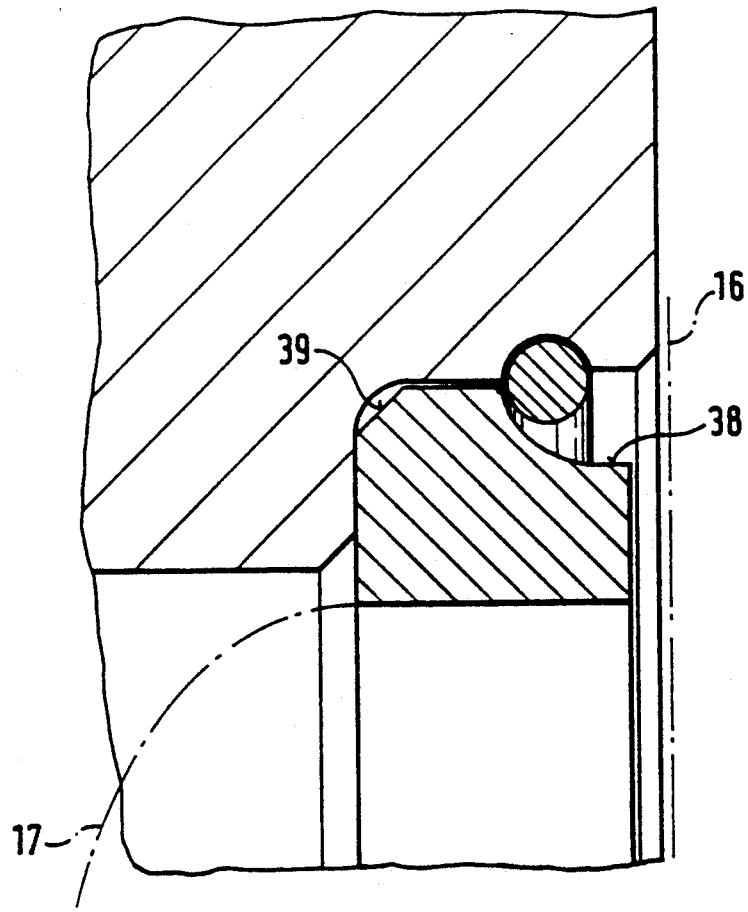
FIG. 5 is an enlarged fragmentary view, partially in section, of a wheel rim, showing the insert ring and retaining ring in position, according to a preferred embodiment of the present invention.

Insert ring 18 has an outer radial face 36, which intersects with chamfer groove 37, which has an arcuate cross-sectional configuration extending radially outwardly to annular surface 26. Groove 37 has a cross-sectional radius, in the immediate vicinity of the transition edge with annular surface 26, of approximately 1 millimeter, and accordingly may be positioned substantially concentric with the center of cross-sectional curvature 28. The radius of groove 37 increases, through a radially inward rotation of 90 degrees, proceeding to cylindrical surface 38, as is best shown in FIG. 5. 45 degree spacer chamfer 39 extends radially inwardly from annular surface 26, to provide clearance from the inner surface of inwardly curving portion 31 of wheel rim 11. In addition to outer radial face or surface 36, insert ring 18 further has an opposed inner radial surface 41, which, when insert ring 18 is installed, abuts snugly against a substantial surface of shoulder 32.

Resilient retaining ring 42 is provided to be fitted into groove 27, once insert ring 18 has been inserted into rim 11. Ring 42 is a cut ring, having a gap defined by ends 43, which preferably have been formed to be free of burrs, sharp edges or similar defects. In the preferred embodiment, the cross-section of ring 42 is 2 millimeters, and the overall, unstressed diameter is 72.3 millimeters. The overall diameter of groove 27 is 72 millimeters, so that when ring 42 is pressed into groove 27, it is in a slightly compressed condition and is thus held within groove 27. As is best illustrated in FIG. 5, when retaining ring 42 is held within groove 27, it extends into chamfer groove 37 to limit axial displacement of insert ring 18. In a preferred embodiment of the invention, ring 42 is fabricated from spring steel.

In the preferred embodiment of the invention, there is a limited axial clearance between wheel rim 11, insert ring 18 and retaining ring 42, when inserted, so as to enable insert ring 18 to undergo axial migration of a few hundredths of a millimeter, so that insert ring 18 does not continuously abut shoulder 32. Retaining ring 42 does, however, prevent the outward migration of insert ring 18 (to the right, as shown in FIG. 5).

It can be seen that in order to accommodate different vehicles, using the wheel rim assembly shown, only the internal diameter of annular surface 19 of insert ring 18 must vary. Thus, the use of a common insert blank during manufacture is possible. Because the separation of annular surface 24 from radial surface 38 is substantially greater than the cross-sectional diameter of ring 42, the insertion of ring 42 after insertion of insert ring 18, and the removal of ring 42 prior to removal of ring 18, is facilitated.

It can be seen, through the foregoing disclosure, that the present invention provides for the economical use of a common wheel rim configuration with a variety of motor vehicles, requiring only the manufacture and storage of relatively small insert rings of varying configuration. In particular, the present invention provides for an advantageously configured insert ring having facilitated installation and removal characteristics, through the use of a resilient retaining ring.

The foregoing description and drawings merely explain and illustrate the invention, and the invention is not limited thereto insofar as the appended claims are so limited, as those skilled in the art and having the disclosure before them will be able to make modifications and variations therein without departing from the scope of the invention.

What is claimed is:

1. A motor vehicle wheel rim assembly adapted for use with a plurality of different vehicles having a plurality of different wheel hub configurations, wherein each wheel hub has a contact surface and a centering body having a particular external diameter less than a predetermined maximum diameter, said wheel rim assembly comprising:

a motor vehicle wheel rim having an internal bore having a predetermined internal diameter greater than the maximum diameter of any centering body particular external diameter, an internal shoulder projecting radially inwardly within the internal bore, a hub bearing surface to be juxtapositioned with the wheel hub contact surface, and an annular groove arranged within the internal bore disposed in spaced relation from the hub bearing surface;

an insert ring, having an first external diameter operably configured to be snugly received within the internal bore of the wheel rim, and further having an internal diameter operably configured to snugly receive the centering body of the wheel hub, the insert ring being configured to be operably positioned substantially concentrically between the centering body and the wheel rim, the insert ring further having a radially projecting external shoulder having a radial surface facing toward the hub bearing surface and extending radially inward from the first external diameter to a second external diameter; and a resilient biasing retaining ring, having an internal diameter less than the first external diameter of the insert ring and greater than the second external diameter of the insert ring, the retaining ring being further operably configured to be fitted substantially between the insert ring and the internal bore of the wheel rim, and partially received within the annular groove within the internal bore at the spaced relation from the hub bearing surface, such that, when the insert ring is positioned within the internal bore, the insert ring is substantially captured between the retaining ring and the internal shoulder of the internal bore of the wheel rim to preclude substantial axial movement of the insert ring with respect to the internal bore of the wheel rim.

2. The wheel rim assembly according to claim 1 wherein the insert ring comprises an uninterrupted toroidal member.

3. The wheel rim assembly according to claim 1 wherein the insert ring is fabricated from harder material than that from which the wheel rim is constructed.

4. The wheel rim assembly according to claim 1 wherein the insert ring is fabricated from machined steel.

5. The wheel rim assembly according to claim 1 wherein the wheel rim has an insertion chamfer operably extending from the hub bearing surface to the internal bore.

6. The wheel rim assembly according to claim 1 wherein the insert ring has an inner radial surface spaced from an opposed outer radial surface, the outer radial surface being substantially parallel to, but does not extend beyond, the hub bearing surface of the wheel rim.

7. The wheel rim assembly according to claim 6 wherein the insert ring has a spacing chamfer operably extending radially inward from the first external diameter.

8. The wheel rim assembly according to claim 6 wherein the insert ring has an internal bore surface and an insertion chamfer is disposed on the insert ring, extending from the outer radial surface toward the internal bore surface, for facilitating insertion of the centering body of the wheel hub.

9. The wheel rim assembly according to claim 1 wherein the retaining ring does not extend axially beyond the hub bearing surface of the wheel rim.

10. The wheel rim assembly according to claim 1 wherein the wheel rim has an insertion chamfer, extending from the hub bearing surface toward the internal bore, for facilitating insertion of the insert ring into the internal bore.

* * * * *